July 30, 1968 E. B. F. BONNEFONT 3,394,676
HEADING-SETTING DEVICE

Filed Oct. 21, 1965 2 Sheets-Sheet 1

Inventor
Edmond Bernard Francois Bonnefont
By
Karl W. Flocks
Attorney

United States Patent Office 3,394,676
Patented July 30, 1968

3,394,676
HEADING-SETTING DEVICE
Edmond Bernard François Bonnefont, Neuilly-Plaisance, France, assignor to Societe Francaise d'Equipements pour la Navigation Aerienne, Neuilly-sur-Seine, France, a joint-stock company of France
Filed Oct. 21, 1965, Ser. No. 499,542
Claims priority, application France, Dec. 16, 1964, 998,905
4 Claims. (Cl. 116—129)

ABSTRACT OF THE DISCLOSURE

Heading setting apparatus with non-linear coupling between the shaft of the pointer of heading to be kept and the rotor of a detector-transmitter. This coupling consists of a cam keyed on the shaft, and a flap having the form of a circular segment for pivoting about the shaft by sliding on the cam, with a lever connecting the cam and the rotor of the detector-transmitter. With this arrangement the signal of the detector-transmitter does not change sign when the difference between the heading to be set and heading held exceeds ±180° by a value determined by the size of the moving flap.

---

The present invention relates to an improvement in heading-indicator devices.

The heading controls known at the present time comprise a fixed reference, opposite which moves a member controlled by a heading station, for example a compass card, in order to give the heading being kept, a pointer coupled to a rotating shaft actuated by the pilot through the intermediary of a differential, the other input of which comes from the servo-control of the said member, in order to indicate the heading to be kept, a detector-transmitter, the rotor of which is coupled linearly to the shaft of the pointer, converting the difference between the heading being held and the heading to be held to an electric signal for effecting the necessary change of heading, controls of this type being only suitable for use for changes of heading less than 180°.

The present invention has for its object to give the pilot the possibility in heading setting apparatus at present in use, of effecting changes in heading greater than ±180°.

The invention is essentially characterized in that the coupling between the shaft of the pointer of the heading to be kept and the rotor of the detector-transmitter is not linear, so that the rotation of the said rotor remains less than ±180° when the difference between the heading to be set and the heading kept exceeds ±180° by a predetermined value.

In one preferred form of construction of the invention, the non-linear coupling between the shaft of the pointer of the heading to be kept and the rotor of the detector-transmitter is effected by means of a cam keyed on the said shaft and a flap having the form of a circular segment, capable of pivoting about the said shaft by sliding on the cam itself, and applied against a stop fixed on the said cam by a first restoring spring, the said cam acting on the rotor of the detector-transmitter through a lever, the free extremity of which carries a roller in contact with the edge of the said cam under the action of a second restoring spring, in such manner that the signal of the detector-transmitter does not change sign when the difference between the heading to be set and the heading held exceeds ±180° by a value determined by the size of the moving flap, the width of the roller being at least equal to the total thickness of the cam proper and of the flap which slides on it.

Figure 1:
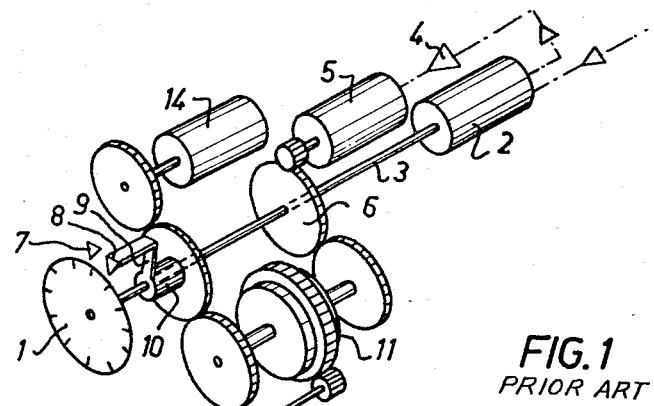
Figure 2:
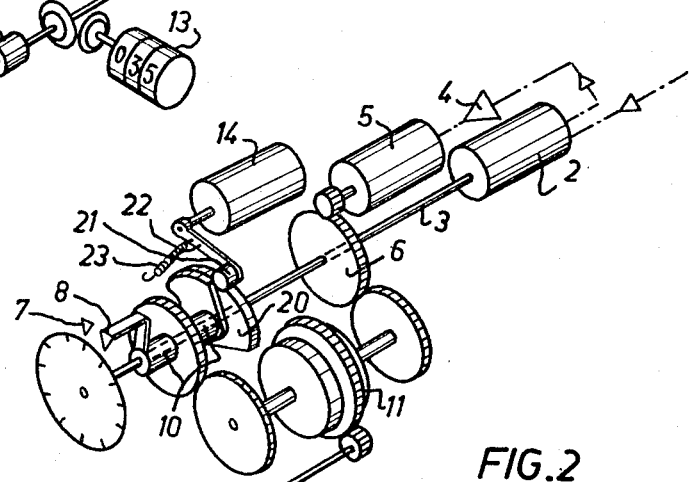
Figure 3:
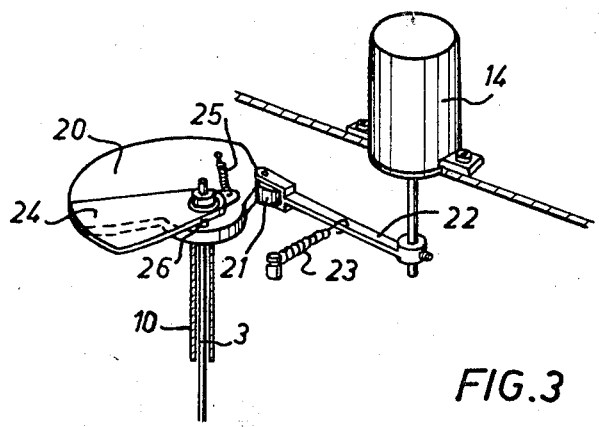
Figure 5:
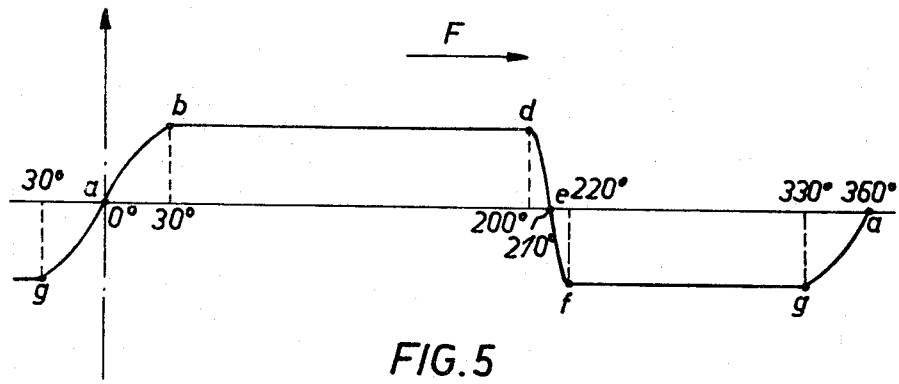
Figure 6:
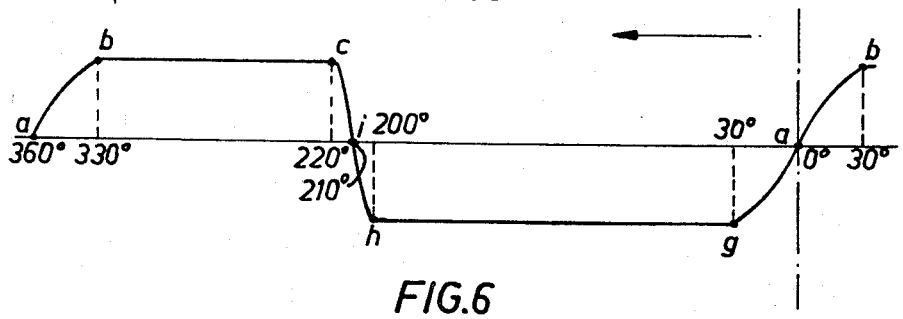
Figure 4:
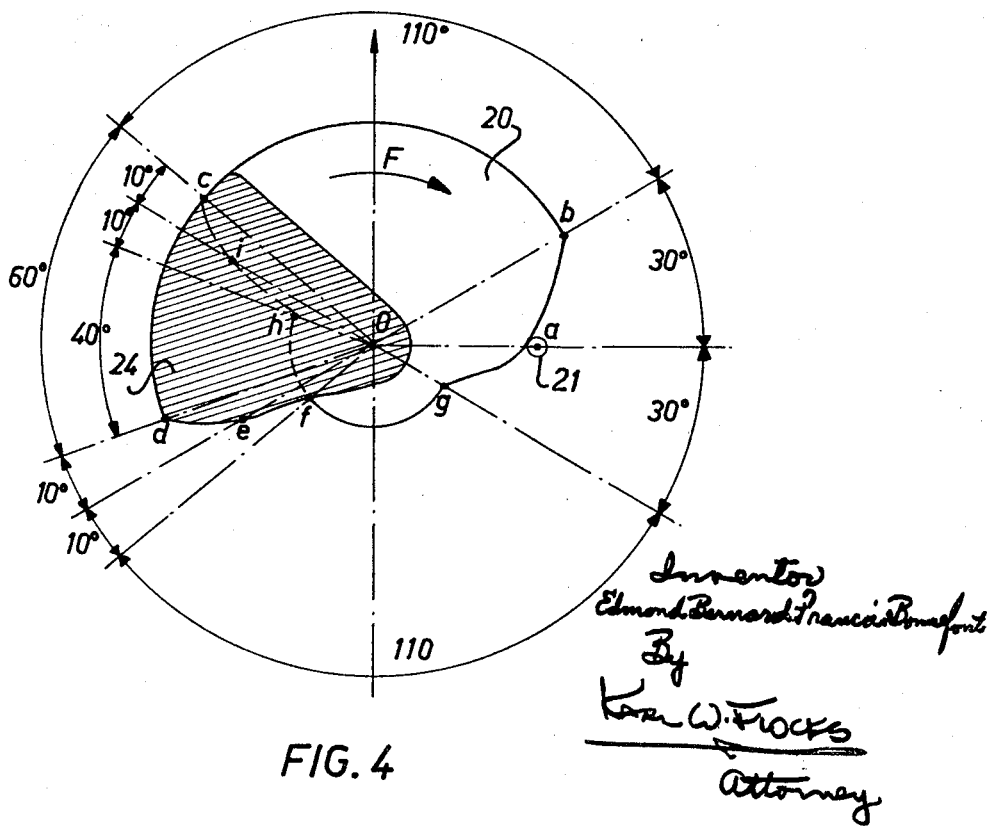

Other characteristic features and advantages of the invention will be brought out in the description which follows below of one preferred form of embodiment of the invention, reference being made to the accompanying drawings, in which:

FIG. 1 shows diagrammatically a heading setting control of known type;
FIG. 2 shows the heading setting control of FIG. 1, as improved in accordance with the invention.
FIG. 3 is a perspective view of the cam, and the detector-transmitter, showing the coupling between them;
FIG. 4 is a plan view of the cam;
FIGS. 5 and 6 show respectively the signal supplied by the detector-transmitter when the cam rotates in one direction or in the other.

In FIG. 1, a compass card 1 is controlled by a heading signal transmitter (not shown) by means of a synchro-detector 2, the said compass card and the rotor of the said synchro-detector being keyed on a common shaft 3. The signal of the synchro-detector 2 is amplified by the amplifier 4 to supply the motor 5, which simultaneously drives, through the intermediary of the shaft 3 and the toothed wheel 6 which is keyed on this shaft, the card 1 and the rotor of the synchro-detector 2, so as to close the loop of the servo-control.

The heading kept is read opposite a fixed reference 7. The pilot can register the heading to be set on the card 1 by means of a moving pointer 8. This pointer 8 is itself fixed to the extremity of an elbowed lever 9 rigidly coupled to the hollow shaft 10, coaxial with the shaft 3. The pilot can displace this pointer 8 by acting on a mechanical differential 11 through the intermediary of the control knob 12, the other input of the differential being taken from the servo-control device of the compass card 1.

The heading to be kept can also appear on a numerical counter 13, operated by the knob 12.

An electric signal representing the difference between the pointer 8 and the reference 7, utilized to control an automatic pilot or a flight director, is supplied by a detector-transmitter 14, synchro or potentiometer, the rotation of the rotor of which is coupled to that of the hollow shaft 10 carrying the pointer 8. The signal obtained starts from a zero value when the difference between the heading to be kept and the heading kept is zero, and increases with this difference, changing sign in the case of a continuous signal, or by 180° in phase in the case of an alternating signal, depending on whether the said difference occurs in one direction or in the other. The result is that the changes in course which can be controlled have an upper limit of 180°; this limit cannot however be attained in practice, due to the fact that the potentiometers have necessarily a discontinuity, while the synchros give a signal which becomes zero at ±180°.

The known device which has been described above can also be arranged in a control station, in which the compass card 1, the fixed reference 7 and the index 8 are dispensed with, whereas the counter 13 still exists.

In FIG. 2 which shows the device of FIG. 1 as improved according to the invention, the coupling between the shaft 10 and the electric detector-transmitter 14 is no longer linear but is obtained through the intermediary of a cam 20 keyed on the hollow shaft 10. (In order to facilitate the understanding of the invention, the reference numbers of the parts of the known device of FIG. 1 which remain in the improved device have been retained.)

On the cam 20 is provided a roller 21, fixed on the extremity of a lever 22 which is pressed into constant contact with the said cam by a spring 23. The lever 22 is in turn keyed on the shaft of the rotor of the detector 14, or drives it through the intermediary of a step-up gearing, the rotation of the shaft of the detector rotor necessarily remaining in all cases less than ±180°.

A flap 24 (see FIG. 3) capable of rotating about the shaft 10 of the cam 20 is associated with this latter so as to be able to slide thereon. A spring 25 fixed on the one hand on the cam 20 and on the other on the flap 24, constantly urges the flap 24 against the stop 26. The width of the roller 21 is at least equal to the thickness of the cam and the flaps 24 when superimposed.

The geometric shapes of the cam 20 and the flap 24 in the present form of embodiment will be made clear from the explanations given later in connection with the operation of the improvement according to the invention.

This operation is as follows:

When the cam 20 (see FIG. 4) rotates in the direction of the arrow F under the action of the pilot acting on the control knob 12, the roller 21 is lifted by the amount $0b-0a$ during the course of a rotation corresponding to the angle $a0b$. The shape of the cam 20 between $a$ and $b$ being designed to give the desired law connecting the signal leaving the detector 14 with the difference of heading, between its zero value and its maximum value, the signal passing out of the said detector at $b$ is maintained up to the maximum difference of heading capable of being effected by the present heading-setting control, namely 200° in the present example.

The circular contour $bc$ of the cam 20, extended by the also circular contour $cd$ of the flap 24, is concentric with the shaft 10 of the cam 20, so that the displacement of the roller 21 does not vary when the said roller 21 moves from $b$ to $d$. From $d$ to $e$, the roller 21 returns to its initial position corresponding to a zero signal.

From $e$ to $f$, the displacement of the roller 21 is reversed and takes the maximum value symmetrical with that which it had on the travel $b-d$. This value is maintained on the circular travel $f-g$, concentric with the shaft 10. From $g$ to $a$, the displacement returns to the value zero, following the same law but changing sign, as between $a$ and $b$.

The curve shown in FIG. 5 gives the form of the signal from the detector 14 over one revolution of 360° of the shaft 10, in the direction of the arrow F. In the example given, it is possible to control a change of heading of 200° (30° from $a$ to $b$, 110° from $b$ to $c$, and 60° from $c$ to $d$) while maintaining the signal from the detector 14 at its constant maximum value, from 30°. The angles corresponding respectively to the travels $de$ and $ef$ are 10°.

When the cam 20 rotates in the direction opposite to the arrow F (return to FIG. 4) the roller 21 falls from $0a$ to $0g$ during the course of the rotation corresponding to the angle $a0g$ equal to the angle $a0b$. The shape of the cam 20 between $a$ and $g$ is thus designed to give the same law, except for the sign, as between $a$ and $b$.

From $g$ to $f$, the roller 21 rolls over the circular part of the cam 20. It comes into contact at $f$ with the flap 24 and pushes back this latter up to $h$ while stressing the spring 25. The signal from the detector 14 thus remains constant from $g$ to $h$. From $h$ to $i$, the signal returns to its zero value and then reverses from $i$ to $c$ at which it has the maximum value symmetrical with that from $g$ to $h$, which it maintains along the travel $cb$, while the flap 24 moves back to its position of rest due to the action of the spring 25.

The curve of FIG. 6 shows the form of the signal over one revolution of 360° of the shaft 10 in the direction opposite to that of the arrow F. This curve is symmetrical with that of FIG. 5 with respect to the origin point 0 of the co-ordinates.

Thus, the detailed shape of the cam 20, as has been described above, will now be clearly apparent:

Between $a$ and $b$, the angle $a0b$ being equal to the angle $a0g$, both being equal to 30° in the present example, the profile of the cam 20 is such that it gives a signal in conformity with the desired law as a function of the rotation of the shaft of the pointer 8, the signal at $b$ having its maximum value;

Between $b$ and $c$, the angle $b0c$ is in this case equal to 110° and the profile is circular;

Between $c$ and $d$, the angle $c0d$ is in this case equal to 60° and the profile is again circular, the radius of the flap and that of the cam being equal;

Between $c$ and $h$, or between $d$ and $f$, the angles $c0i$, $i0h$, $d0e$ and $e0f$ are each equal to 10°; the profiles $ci$ and $de$ bring back the signal from its maximum value to its zero value, while the profiles $ih$ and $ef$ cause it to pass from this zero value to its maximum value, but changed in sign;

Between $h$ and $g$, the angle $g0h$ is in this case equal to 170° and the profile is circular;

Between $g$ and $a$, the angle being 30°, the law of the signal obtained is the same as that obtained between $a$ and $b$, but of opposite sign.

It will, of course, be understood that the invention has only been described and illustrated by way of explanation and not in any limitative sense, and that modifications of detail can be made thereto without thereby modifying its scope. Thus, for example, the cam 20 can, if reasons of convenience make this necessary, be driven by a train of gears at the same speed as the shaft 10, instead of being keyed on the said shaft 10.

I claim:

1. An improved heading setting device comprising
   indicating means controlled by a heading signal transmitter to indicate the heading being held,
   a fixed reference device mounted adjacent and in operative relationship with said indicating means,
   a differential system having first and second input shafts and manual actuating means connected thereto,
   a pointer mounted adjacent said indicating means and having a rotatable shaft upon which said pointer is mounted for movement,
   said pointer operatively connected through said rotatable shaft to said first input shaft,
   a servo control coupled to said second input shaft and to said indicating means so that said pointer will indicate on said indicating means the heading to be kept,
   a detector-transmitter having a rotor and adapted to convert the difference between the heading being held and the heading being kept to an electric signal intended to effect the change of heading,
   non-linear coupling means connecting said rotor of said detector-transmitter to said rotatable shaft of said pointer so constituted that the rotation of said rotor remains less than ±180 degrees when the difference between the heading to be kept and the heading actually held exceeds 180 degrees by a certain value.

2. An improved heading setting device as claimed in claim 1, in which said non-linear coupling means includes a compound cam formed by two elements concentric with the shaft of said pointer, said compound cam comprising a cam proper keyed on said rotatable shaft and a flap having the shape of a circular sector capable of pivoting about said rotatable shaft by sliding on said cam proper, said sector being applied against a fixed abutment on said cam proper by a first restoring spring, said cam proper being coupled to the rotor of said detector-transmitter by a lever, the free extremity of which carries a roller held in contact with the profile of said cam by a second restoring spring, so that the signal on said detector-transmitter does not change in sign when the difference between the heading to be kept and the heading being held exceeds ±180° by a certain value.

3. An improved heading setting device as claimed in claim 2, in which said value in excess of ±180° is a function of the angle subtended at the center of said moving flap, and the width of said roller is at least equal to the total thickness of the cam proper and of said flap.

4. An improved heading setting device as claimed in claim 1, in which the profile of said cam proper comprises two circular sectors concentric with said rotatable shaft of said pointer, the apex angles and the radii of said sectors being different, the profile of the two sectors being joined to each other by two curves, a first curve so designed that said roller, when moving from the point of intersection of said curve and the bisecting line of its angle at the center, gives the shaft of the rotor of said detector-transmitter a movement following the desired law associating the signal of the detector-transmitter with the difference between the heading to be kept and the heading being held, and following the same law but of opposite sign for the movement in the opposite direction; a second curve designed so that the roller in contact therewith imparts to the shaft of the rotor of the detector-transmitter a movement giving a zero signal to said detector-transmitter when the roller passes the point of intersection between said curve and the bisecting line of its apex angle and, on each side of this point, a signal which varies continuously between this zero value and the maximum values, of opposite sign, at its extremities.

References Cited
UNITED STATES PATENTS 3,220,252   11/1965   Wright _____ 73—178

DAVID SCHONBERG, *Primary Examiner.*

JOSEPH W. ROSKOS, *Assistant Examiner.*